(12) United States Patent
Barman et al.

(10) Patent No.: US 11,176,382 B2
(45) Date of Patent: Nov. 16, 2021

(54) SYSTEM AND METHOD FOR PERSON RE-IDENTIFICATION USING OVERHEAD VIEW IMAGES

(71) Applicant: Conduent Business Services, LLC, Dallas, TX (US)

(72) Inventors: Arko Barman, Houston, TX (US); Wencheng Wu, Rochester, NY (US); Robert P. Loce, Webster, NY (US); Aaron Michael Burry, Ontario, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 772 days.

(21) Appl. No.: 15/450,974

(22) Filed: Mar. 6, 2017

(65) Prior Publication Data
US 2018/0253596 A1 Sep. 6, 2018

(51) Int. Cl.
| G06K 9/00 | (2006.01) |
| H04N 5/232 | (2006.01) |
| G06K 9/42 | (2006.01) |
| G06K 9/20 | (2006.01) |
| H04N 7/18 | (2006.01) |

(52) U.S. Cl.
CPC ..... G06K 9/00771 (2013.01); G06K 9/00369 (2013.01); G06K 9/209 (2013.01); G06K 9/42 (2013.01); H04N 5/23238 (2013.01); H04N 7/188 (2013.01)

(58) Field of Classification Search
CPC ........... G06K 9/00362; G06K 9/00771; H04N 5/23238

USPC .......... 348/36, 143, 157; 382/118; 250/221; 707/766
See application file for complete search history.

(56) References Cited

U.S. PATENT DOCUMENTS

| 2005/0257748 A1* | 11/2005 | Kriesel | A01K 11/008 119/51.02 |
| 2006/0208169 A1* | 9/2006 | Breed | B60N 2/002 250/221 |
| 2007/0201730 A1* | 8/2007 | Masaki | G06K 9/00288 382/118 |
| 2015/0297949 A1* | 10/2015 | Aman | G06T 7/246 348/157 |
| 2016/0378861 A1* | 12/2016 | Eledath | G06K 9/00718 707/766 |
| 2017/0169297 A1* | 6/2017 | Bernal | G06T 7/0081 |

* cited by examiner

*Primary Examiner* — Brian P Yenke
*Assistant Examiner* — Sean N. Haiem

(57) ABSTRACT

A method, non-transitory computer readable medium and apparatus for performing a person re-identification using an overhead view image are disclosed. For example, the method includes receiving a plurality of overhead view images, detecting a target person in one or more of the plurality of overhead view images, creating a probe image of the target person, receiving a selection of the probe image containing the target person, selecting one or more of the plurality of processed images that has a similar distortion profile as a distortion profile of the probe image based on a radial distance of the target person from a center of a respective overhead view image of the plurality overhead view images used to generate the probe image and performing the person-re-identification of the target person using the one or more of the plurality of processed images that are selected.

20 Claims, 6 Drawing Sheets

SYSTEM AND METHOD FOR PERSON RE-IDENTIFICATION USING OVERHEAD VIEW IMAGES

The present disclosure relates generally to image processing and, more particularly, to a system and method for person re-identification using overhead view imaging.

BACKGROUND

Re-identification is a process to match an image or images of an individual to various other images that may contain the individual. For example, images of certain areas, locations, scenes and the like can be captured. Sometimes, the images of the areas, locations, scenes, and the like may be public areas that include many individuals in the image. Re-identification may be used to match to the image of a person seen in the images that are captured to other images of the person.

Re-identification can be used to identify people for security or surveillance applications. Currently, the images used for re-identification are captured by rectilinear cameras from side or oblique views. As a result, all individuals within the images have the same orientation. For example, everyone's heads may be at a top of the image and everyone's torso or legs may be below the head and towards a bottom of the image. As a result, the images can be analyzed relatively easily with available image analysis techniques.

SUMMARY

According to aspects illustrated herein, there are provided a method, non-transitory computer readable medium and apparatus for performing a person re-identification using an overhead view image. One disclosed feature of the embodiments is a method that receives a plurality of overhead view images, detects a target person in one or more of the plurality of overhead view images, creates a probe image of the target person, receives a selection of the probe image containing the target person, selects one or more of the plurality of processed images that has a similar distortion profile as a distortion profile of the probe image based on a radial distance of the target person from a center of a respective overhead view image of the plurality overhead view images used to generate the probe image and performs the person-re-identification of the target person using the one or more of the plurality of processed images that are selected.

Another disclosed feature of the embodiments is a non-transitory computer-readable medium having stored thereon a plurality of instructions, the plurality of instructions including instructions which, when executed by a processor, cause the processor to perform operations that receive a plurality of overhead view images, detect a target person in one or more of the plurality of overhead view images, creating a probe image of the target person, receive a selection of the probe image containing the target person, select one or more of the plurality of processed images that has a similar distortion profile as a distortion profile of the probe image based on a radial distance of the target person from a center of a respective overhead view image of the plurality overhead view images used to generate the probe image and perform the person-re-identification of the target person using the one or more of the plurality of processed images that are selected.

Another disclosed feature of the embodiments is an apparatus comprising a processor and a computer-readable medium storing a plurality of instructions which, when executed by the processor, cause the processor to perform operations that receive a plurality of overhead view images, detect a target person in one or more of the plurality of overhead view images, creating a probe image of the target person, receive a selection of the probe image containing the target person, select one or more of the plurality of processed images that has a similar distortion profile as a distortion profile of the probe image based on a radial distance of the target person from a center of a respective overhead view image of the plurality overhead view images used to generate the probe image and perform the person-re-identification of the target person using the one or more of the plurality of processed images that are selected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a system and method for re-identifying a person using an overhead view image. As discussed above, re-identification is a process to match an image or images of an individual to various images that may contain the individual. For example, images of certain areas, locations, scenes and the like can be captured. Sometimes, the images of the areas, locations, scenes, and the like may be public areas that include many individuals in the image. Re-identification may be used to match the image of an individual seen in the images that are captured to other images of the individual.

Re-identification can be used to identify people for security or surveillance applications. Currently, the images used for re-identification are captured by rectilinear cameras from side or oblique views. As a result, all individuals within the images have the same orientation. For example, everyone's heads may be at a top of the image and everyone's torso or legs may be below the head and towards a bottom of the image. As a result, the images can be analyzed relatively easily with available image analysis techniques.

However, many surveillance cameras now capture overhead view images. For example, the overhead view images may have a circular distortion. For example, the overhead view image may have a center point directly below the surveillance camera's central axis and the individuals may be located around an annular space around the center point.

As a result, there may be no standard orientation of individuals in the overhead view image. For example, a person at the top of the overhead view image may have his head above his torso and a person at the bottom of the overhead view image may have his torso above his head. In addition, the overhead view image may only show the top of a person's head if he or she is standing directly below the surveillance camera. As a result, simply using currently available image analysis techniques to perform re-identification on overhead view images may not be sufficient or accurate.

Embodiments of the present disclosure provide a novel apparatus and method that processes the overhead view images such that re-identification can be performed using the overhead view images. For example, the overhead view images can be processed to identify portions of the overhead view image that contain people and then process image portions containing the people such that they are in a proper orientation for comparisons to other images for re-identification.

Figure 1:
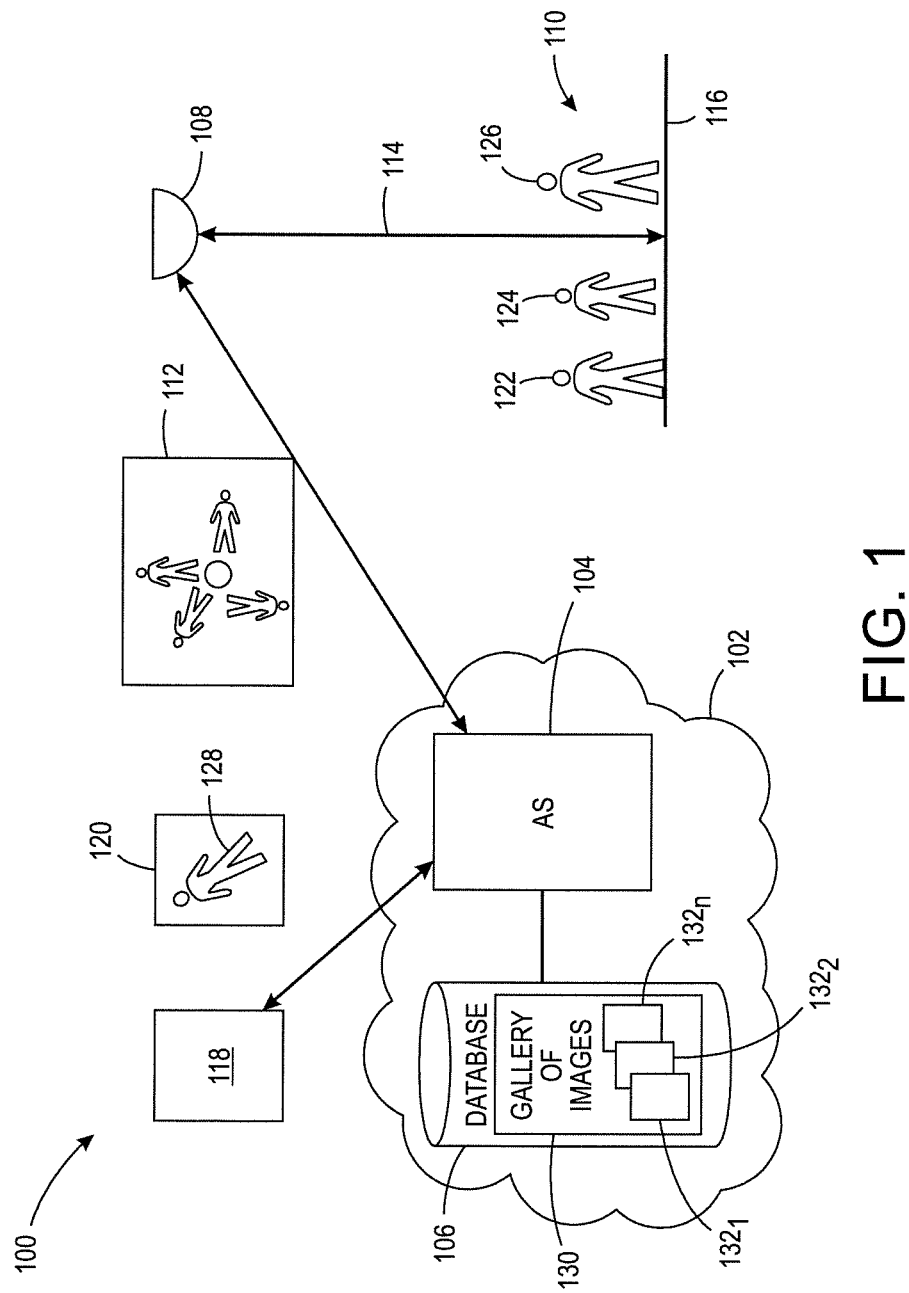
FIG. 1 illustrates an example system of the present disclosure.

FIG. 1 illustrates an example system 100 for performing a person re-identification. In one embodiment, the system 100 may include a communication network 102. The communication network 102 may be an Internet Protocol (IP) network that may use wired or wireless communications. The communication network 102 may include an application server (AS) 104 and a database (DB) 106. The communications network 102 has been simplified for ease of explanation and may include additional devices (e.g., a gateway, a firewall, a router, a switch, and the like) and/or access networks (e.g., a broadband access network, a cellular access network, and the like) that are not shown.

The AS 104 may be a dedicated sever that is configured to perform the functions described herein. The DB 106 may store various information. For example, the DB 106 may store a gallery of images 130 that contain one or more processed images $132_1$ to $132_n$ (herein also referred to individually as a processed image 132 or collectively as processed images 132). In one embodiment, the processed images 132 may be processed versions of one or more overhead view images 112 (discussed below) used for training the re-identification programs or methods used in the present disclosure, used for creating a probe image 120 and used for performing the re-identification. Although a single overhead view image 112 is illustrated in FIG. 1, it should be noted that overhead view image 112 may comprise a plurality of different overhead view images 112. For example, the plurality of overhead view images 112 may be a series of still images from a video image of a person walking through a location, images taken at different times, images of different locations, or any combination thereof. The DB 106 may also store profile information of various individuals, and the like.

In one embodiment, the system 100 may include a camera 108. In one embodiment, the camera 108 may be mounted on a ceiling and capture the one or more overhead view images 112 of a location 110. In one embodiment, the camera 108 may be a wide angled lens camera or a fisheye camera. The camera 108 may be a visible or a near infrared (NIR) video surveillance camera operating at frame rates such as 15 frames per second (fps), 30 fps, 60 fps, and the like. The camera 108 may capture images at resolutions of 1920 pixels×1080 pixels, 1280 pixels×1024 pixels, 1280 pixels×720 pixels, 1280 pixels×960 pixels, 2048 pixels× 1536 pixels, and the like. The camera 108 may capture video that can be processed to produce the overhead view image 112 or may capture pictures or still images to produce the overhead view image 112.

In the present disclosure, the overhead view image 112 may be used to generate the processed images 132 stored in the gallery of images 130 and to generate the probe image 120. The overhead view images 112 may be captured by different cameras or at different locations. Different images from the overhead view images 112 can be used to generate the processed images 132 stored in the gallery of images 130 and to generate the probe image 120.

In one embodiment, the location 110 may include a plurality of persons or individuals 122, 124 and 126. Although three people are illustrated in FIG. 1, it should be noted that the location 110 may include any number of people that can be captured by the overhead view image 112.

In one embodiment, an overhead view image may be defined as an image captured with a viewing axis 114 that is substantially perpendicular to a floor 116. The overhead view images 112 that are captured may be distorted as a function of annular distance from a center of the image. As a result, different distortions may occur for individuals located at different locations, orientations and annular distances from the center of the image. Examples of the overhead view images are illustrated by an example overhead view images 302 and 304 in FIG. 3, and discussed below.

The overhead view images 112 may be transmitted, via a wired or wireless connection, to the AS 104 via the communications network 102. The overhead view images 112 may be sent as data in any image format such as, for example, a portable document file (PDF), a JPEG file, a GIF file, a RAW file, a TIFF file, a bitmap (BMP) file, and the like. The communications network 102 may be remotely located from the location 110 and the overhead view images 112 may be transmitted over a wide area network (WAN). In another embodiment, the communications network 102 may be local to the location 110 and the overhead view images 112 may be transmitted over a local area network (LAN).

In one embodiment, the overhead view images 112 may be used to form the processed images 132 in the gallery of images 130 to perform a re-identification of a target person 128 in the probe image 120 that is also acquired as an overhead view image 112. The overhead view images 112 used to form the gallery of images 130 may be extracted from video images from the camera 108 that are captured at an earlier time or a similar camera at a different location. The probe image 120 may be selected and transmitted to the AS 104 using an endpoint device 118 that may be in communication with the AS 104 via a wired or wireless communication path. The endpoint device 118 may be any type of computing device that is capable of communicating via a wired or wireless connection with the AS 104 via the communication network 102. For example, the endpoint device 118 may be a desktop computer, a laptop computer, a tablet computer, a smartphone, and the like.

In one embodiment, the endpoint device 118 may submit a request to perform a re-identification of the target person 128 by submitting the probe image 120 or submitting a selection of the probe image 120 that may be generated by the AS 104. The probe image 120 may be transmitted as data in any image format such, as a PDF, a JPEG file, a GIF file, a RAW file, a TIFF file, a BMP file, and the like.

Figure 2:
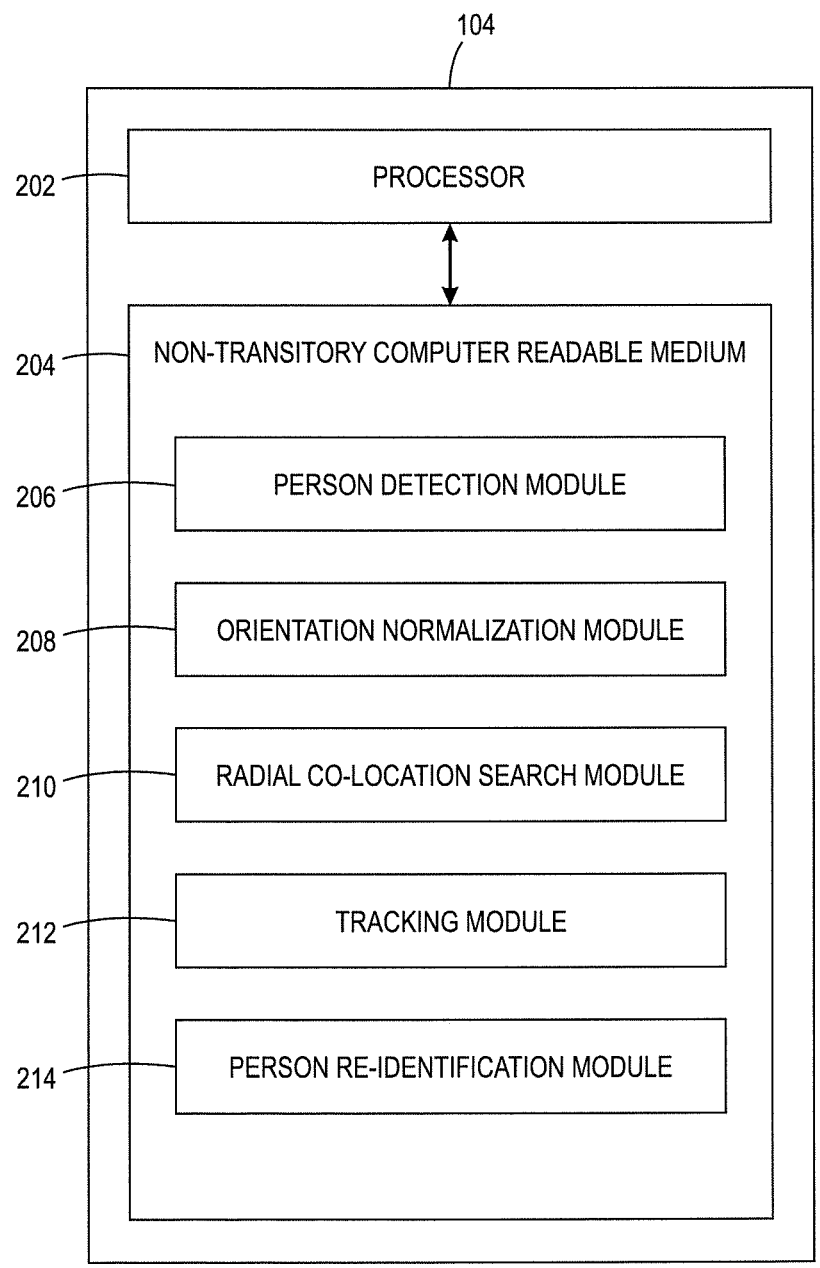
FIG. 2 illustrates an example application server for performing the re-identification based on overhead view images of the present disclosure.

In one embodiment, the probe image 120 may be processed by the AS 104 to compare the probe image 120 to the one or more processed images 132 to perform the re-identification of the target person 128. The AS 104 may perform processing on the overhead view images 112 to generate the processed images 132 of the gallery of images 130. The processing may include, for example, detecting one or more persons within the overhead view images 112, detecting persons at a particular radial or annular distances and processing the image of the selected persons into a particular orientation The processed images 132 may be used to form the gallery of images 130 for re-identification with a probe image 120. The AS 104 may also perform processing on an overhead view image 112 acquired to create the probe image 120, such as detecting one or more persons within the acquired image and extracting an image portion containing a target person, detecting the radial or annular distance of the selected person, and processing the image of the selected person to an orientation used in forming the gallery images. The probe image 120 may then be compared to the processed images 132 to perform the re-identification. Further details of the components of the AS 104 that perform each function are illustrated in FIG. 2 and discussed below. Further details of the processing performed by the AS 104 are also discussed below.

FIG. 2 illustrates an example AS 104. In one embodiment, the AS 104 may include a processor 202 and a non-transitory computer readable medium 204. The non-transitory computer readable medium 204 may store instructions for performing the functions described herein that are executed by the processor 202.

In one embodiment, the non-transitory computer readable medium 204 may include various modules to that are executed by the processor to perform various different functions. For example, the modules may include a person detection module 206, an orientation normalization module 208, a radial co-location search module 210, a tracking module 212 and a person re-identification module 214.

In one embodiment, the person detection module 206 may analyze the overhead view images 112 to detect a person or persons within the overhead view image 112. For example, the person detection module 206 may detect pixels that are associated with a human using various existing methods or algorithms (e.g., You Only Look Once (YOLO), Deformable Part Model (DPM), and the like. For example, one can detect the presence of persons in an image by utilizing computer vision techniques for object recognition and localization. These techniques may entail a training stage, where the appearance of multiple example persons (e.g., cropped out of training images) in a given feature space (e.g., Deep features, Harris Corners, scale-invariant feature transform (SIFT), speeded-up robust features (SURF), histogram of oriented gradients (HOG), local binary patterns (LBP), or other learned features) is input to a classifier (e.g., Neural Net, decision tree, support vector machine (SVM), expected maximization (EM), k-nearest neighbors, clustering algorithms, etc.) that is trained on the available sample feature representations. The trained classifier is then applied to features extracted from various regions of interest of an image and outputs the parameters of bounding boxes (e.g., location, width and height) surrounding the matching candidates.

In one example, the various regions of interest may be determined in a sliding window fashion or they may be outputs from algorithms that measure objectiveness in an image and return various regions of interest based on how likely an object is bounded by each returned region of interest. Additionally, non-maximum suppression may be applied to determine the final locations of persons in the image based on the scores of the classifier for these various regions of interest and the amount of overlap among them.

For another example, the detection of the presence of persons may be achieved by a computer vision method that trains on a set of labeled person images (images with corresponding labels of the bounding boxes of each person in the image) using a deep neural network for feature extraction and using regression models as a way to detect the presence of persons in the image and their locations (e.g., the method disclosed in YOLO).

In the case of video or a temporal sequence of images, the following methods can be used for person detection as well. For example, temporal differencing algorithms can detect objects in motion in the scene; alternatively, background subtraction, which requires the estimation of the stationary scene background followed by subtraction of the estimated background from the current frame, can detect foreground objects (which include objects in motion). The output of either approach is a binary mask with the same pixel dimensions as the input video, and having values equal to 0 where no motion/foreground objects are detected and values equal to 1 at pixel locations where motion/foreground objects are detected. This detection mask can then be post-processed via morphological operations that discard detected objects with size and orientation outside pre-determined ranges determined by the geometry of the capture. The detected object can then be deemed as a person or not a person based on the said post-processing. In addition, the cropped image of these bounding boxes may be input into the previously mentioned person-classifier to further confirm or discard as a person.

The person detection module 206 may perform additional processing within a region of interest such as foreground extraction to detect foreground pixels (e.g., foreground pixels of only person pixels) and subtracting background pixels to improve the performance of the person re-identification.

The person detection module 206 may then create additional images of each person detected from the overhead view images 112. Furthermore, acquiring multiple overhead view images 112 as in a video allows for detection of the same person at different orientations and radial distances as they move through a scene. Each of these detections can be used to form a set of sub images that can be used for re-identification of that person in later operations. Similar sets of sub images can be formed for other persons and processed, as discussed below, to create the processed images 132 in the gallery of images 130 where each person is represented by one or more of the processed images 132. The sub images can be acquired when the respective person was at different locations and radial distances.

In one embodiment, the orientation normalization module 208 may normalize each one of the additional images of each person detected in the overhead view image 112 to generate the processed images 132 that are placed into the gallery of images 130. In other words, the processed images 132 of each person that is detected in the overhead view image 112 may be rotated to yield an "up-right" representation of the person. Said another way, the additional images of each person that is detected in the overhead view image 112 may be rotated so that the head of the person is at a top of the image in the gallery of images 130.

Similarly, the person detection module 206 may then create additional images of persons detected from other overhead view images 112 to create the probe image 120. The additional images may simply be an isolated view of a sub-region of the overhead view image 112. For example, each person in the overhead view image 112 may be separated out into an additional probe image 120. FIG. 4 illustrates examples of the additional probe images 402, 406 and 410 that can be created from the example overhead view images 302 and 304 in FIG. 3.

In one embodiment, the orientation normalization module 208 may normalize each one of the additional images of each person detected in the overhead view image or images 112 to generate the processed images 132 and the probe image 120. In other words, the additional images of each person that is detected in the overhead view image 112 may be rotated to yield an "up-right" representation of the person. Said another way, the additional images of each person that is detected in the overhead view image 112 may be rotated so that the head of the person is at a top of the image for the processed images 132 and the probe image 120.

FIG. 4 illustrates examples of the additional probe images 402, 406 and 410 being normalized by the orientation normalization module 208 into normalized probe images 404, 408 and 412, respectively. For example, in the additional probe image 402 the person appears to be upside down. The orientation normalization module 208 may rotate the probe image 402 to create the normalized probe image 404 such that the head of the person is at the top of the image. Similarly, the additional probe image 406 shows a person that appears to be sideways (e.g., the head of the person is on a left side of the image. The orientation normalization module 208 may rotate the probe image 406 to create the normalized probe image 408 such that the head of the person is at the top of the image. The additional probe image 410 may be similarly normalized to create the normalized probe image 412.

In one embodiment, normalization may be defined to orient the person in the additional probe images 402, 406 and 410 to be in a same orientation as persons in the processed images 132 stored in the gallery of images 130. For example, if the person is at a 45 degree angle (e.g., the head of the target person 128 is in a top right corner or top left corner of the probe image 120), then the orientation normalization module 208 may normalize the probe images 402, 406 and 410 to rotate the persons to a 45 degree angle in the normalized probe images 404, 408 and 412. In one embodiment, the probe image 120 may be a normalized probe image 404, 408 or 412.

In one embodiment, the orientation normalization module 208 may perform the rotation by analyzing an additional image to detect pixels associated with a head and pixels associated with a torso or feet of the person. Then the additional image can be rotated such that the pixels associated with the head are at the top of the image. In another embodiment, the orientation normalization module 208 may perform the rotation by using an orientation-correction map that is pre-defined or trained based on various training images captured by the camera 108 that is static or fixed. In another embodiment, the orientation normalization module 208 may perform the rotation by using a table look-up to find the angle needed for each person based on its position in the field of view and using the angle to rotate the additional image of the person without any estimation of human pose. The values in the table look-up may be derived from a camera calibration procedure using known arts. The values in the table look-up may also be derived from interpolation of the values from a set of training samples, where the locations and orientations of persons in the training samples are known.

It should be noted that the processing of the normalization module 208 described above may also be applied to the overhead view images 112 to form the processed images 132. In other words, the processing that is described above and applied to the overhead view images 112 to form the probe image 120 may be equally applied to the overhead view images 112 to generate the processed images 132.

In one embodiment, the radial co-location search module 210 may select an appropriate sub-set of the processed images 132 in the gallery of images 130 of the persons based on a radial position of the probe image 120. For example, overhead view images 112 used to make the processed images 132 may have different distortion profiles at different annular regions. Thus, the radial co-location search module 210 may determine a radial distance based on a distortion profile of the target person 128 in the probe image 120 and select the processed images 132 that are from the same annular region defined by the determined radial distance for the comparison that produces a re-identification.

In one embodiment, the co-location search module 210 may select the processed images 132 from the annular regions next to the same annular region of the probe image 120 if there is no sample available in the same annular region or the matching score is below a pre-specified threshold. In one embodiment, the co-location search module 210 may sort the processed images 132 for comparison with the target person 128 in the order of the absolute differences between the radial distance of the persons in the processed images 132 and that of the target person 128. In yet another embodiment, the matching score between a person in a processed image 132 and the target person 128 may be further weighted by the absolute difference between the radial distance of the person in the processed image 132 and that of the target person 128.

Figure 3:
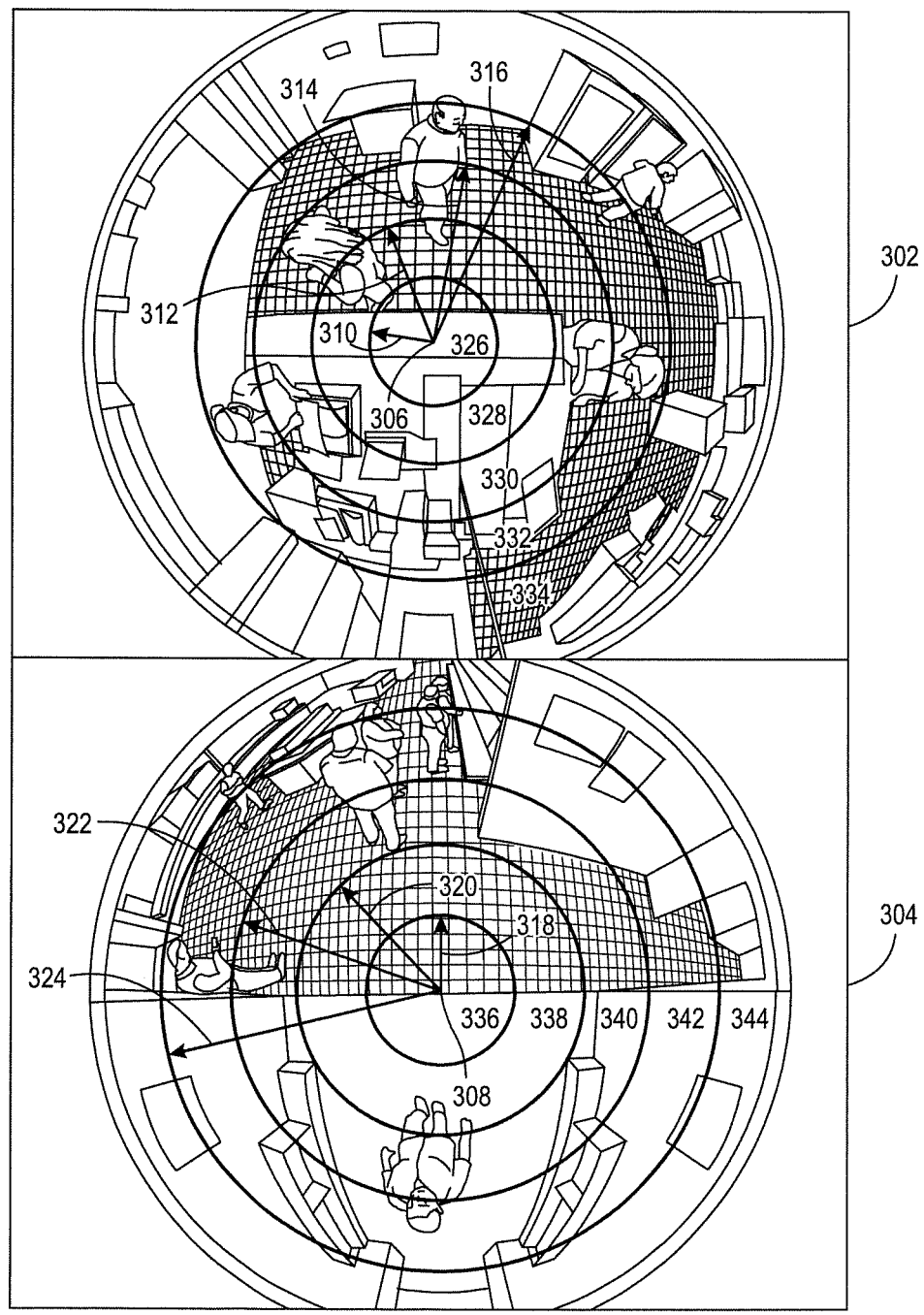
FIG. 3 illustrates example overhead view images captured by the system of the present disclosure.
Figure 4:
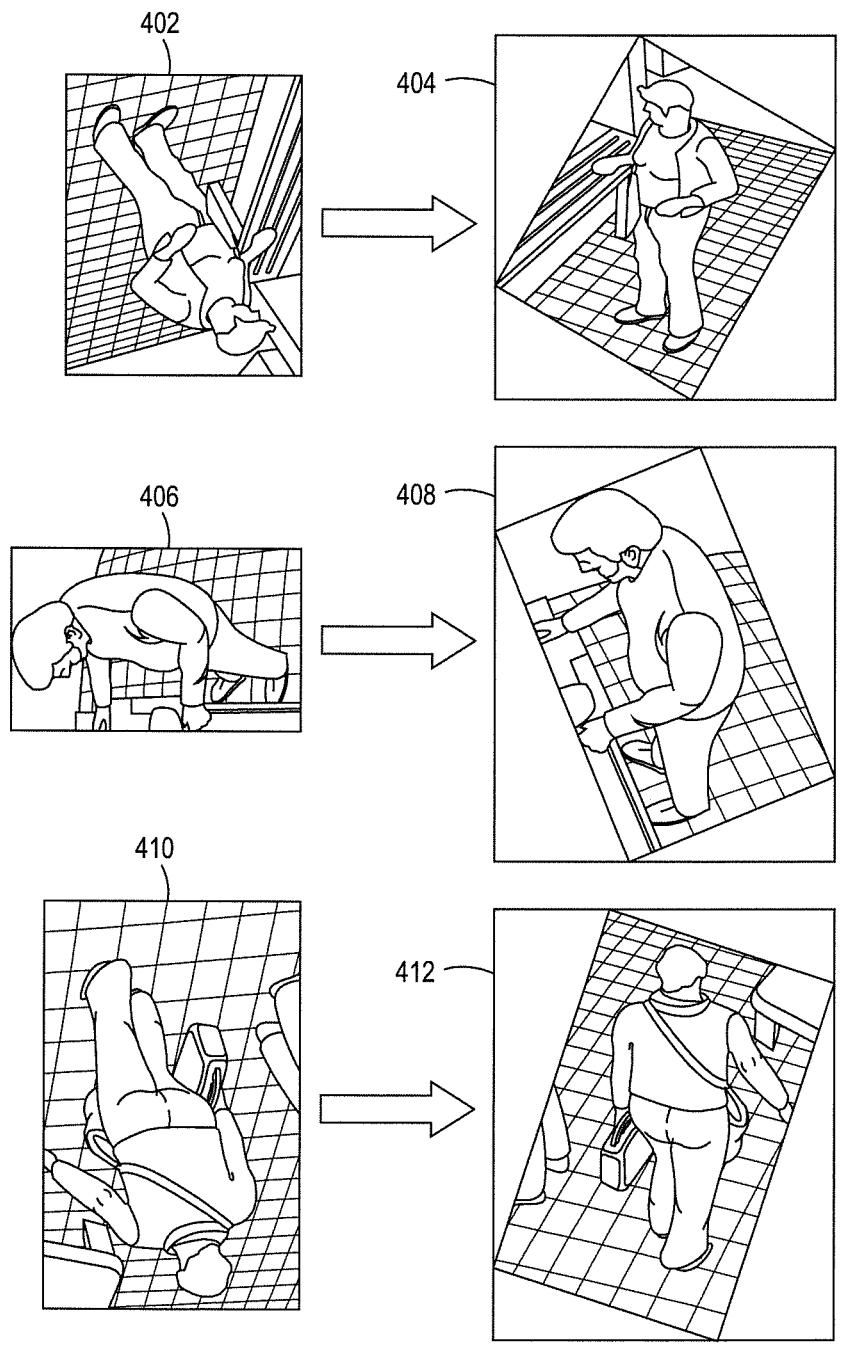
FIG. 4 illustrates example images of persons detected in the overhead view images.

FIG. 3 illustrates the example overhead view images 302 and 304. The example overhead view images 302 and 304 may each have a center point 306 and 308, respectively. The example overhead view image 302 may have annular regions 326, 328, 330, 332 and 334 defined by the different radial distances 310, 312, 314 and 316 measured from the center point 306. Similarly, the example overhead view image 304 may have annular regions 336, 338, 340, 342 and 344 defined by the different radial distances 318, 320, 322 and 324. It should be noted that the number of annular regions within the example overhead view images 302 and 304 are provided as examples only. The example overhead view images 302 and 304 may be divided into any number of annular regions. For example, the more annular regions the more accurate the distortion profile may be, thereby, leading to a more accurate performance of the person re-identification.

However, the more annular regions may lead to more difficulty to find processed images 132 in the same annular region of the target person 128 for re-identification. This means more collection of processed images 132 (e.g., collected from tracking module 212) would be needed. Therefore, there would be a trade-off in using more annular regions versus collecting less processed images 132 for re-identification.

Referring to the example overhead view image 302, the different annular regions 326, 328, 330, 332 and 334 may each have different distortion profiles. For example, only the top of the head of a person may be seen of persons located within the annular region 326. In the annular region 328, a small portion of the feet and the head may be seen. In the annular region 330, the head of the portion and the entire body may be seen, but they may appear to be very short. In the annular region 332, more of the entire person may be seen at a more normal proportion. In the annular region 334 the person may appear to be stretched and very long.

The AS 104 may determine that the target person 128 has a distortion profile that would appear at a radial distance 316 from the center point 306 of the example overhead view image 302. As a result, one or more processed images 132 of persons located within the annular region 332 may be selected to perform the person re-identification. Similarly, the radial distance 324 from the center point 308 of the example overhead view image 304 may have the same, or similar, distortion profile of the target person 128 in the probe image 120. As a result, one or more additional processed images 132 of persons located within the annular region 342 may be selected to perform the person re-identification.

Notably, previous re-identification systems that used rectilinear camera views did not use an orientation normalization module 208 or a radial co-location search module 210. For example, the rectilinear camera would capture images with minimal distortion and everyone in the same orientation. However, with the overhead view images 112, the images may have a radial distortion where some portions of the image only reveal a top view of a person's head, while other portions stretch the person, and other varying amounts of distortion in between. In addition, a person may be located at any portions of the overhead view image 112. Thus, at a bottom of the overhead view image 112 the person may appear to be upside down. Thus, the orientation normalization module 208 and the radial co-location search module 210 resolve these issues associated with the overhead view image 112.

In one embodiment, the tracking module 212 may analyze video that may be captured by the camera 108 in an entire field of view or in pre-determined regions in a scene and create snapshots (e.g., the overhead view images 112) that include potential persons of interest. For example, the potential persons of interest may be tracked frame by frame from the video and create overhead view images 112 from snapshots of the video. For example, the tracking module 212 may be used when the camera 108 is capturing video. The snapshots that produce the overhead view images 112 may then be processed and used to perform the person re-identification, as described above.

In one embodiment, the tracking module 212 may also be used to track a person that has been re-identified (e.g., the target person 128) in subsequent overhead view images. For example, subsequent overhead view images may be captured in regions that may include the person that has been re-identified and the additional images of the person that has been re-identified may be created from the subsequent overhead view images. In one embodiment, the additional images of the person that has been re-identified may be based on the radial distance from the center of the subsequent overhead view images that provides a same, or similar, distortion profile as the probe image 120.

In one embodiment, the person re-identification module 214 may perform the person re-identification using the probe image 120 and the processed images 132 in the gallery of images 130. It should be noted that any number of processed images 132 may be used. For example, hundreds or thousands of processed images 132 may be contained in the gallery of images 130 may be stored in the DB 106 and used to perform the person re-identification.

The person re-identification module 214 may use any existing re-identification method or algorithm. Examples of person re-identification algorithms may include methods focusing on feature extraction such as person re-identification based on symmetry-driven accumulation of local features (SDALF), unsupervised salience learning and local maximal occurrence representation, or methods focusing on metric learning, such as person re-identification based on Cross-view Quadratic Discriminant Analysis, and Large Scale Metric Learning from Equivalence Constraints, and more recently, person re-identification based on deep feature learning with relative distance comparison for person re-identification pattern recognition, and the like.

Thus, using the various modules 206, 208, 210, 212 and 214, the AS 104 may process captured or produced overhead view images 112 that are received to generate the processed images 132 in the gallery of images 130 that are used for person re-identification. For example, the AS 104 may create additional images of person detected within the overhead view image 112, orient the additional images correctly to create the probe image 120, select a correct sub-set of the processed images 132 based on a radial distance determined from a distortion profile of the probe image 120 and perform the person re-identification. In one embodiment, the AS 104 may generate a confirmation of a match or provide the processed images 132 from the gallery of images 130 that match the probe image 120 to the endpoint device 118. In other words, the AS 104 may generate an output based on the person re-identification that is performed and transmit the output (e.g., the confirmation, selected processed images 132, and the like) to the endpoint device 118.

Figure 5:
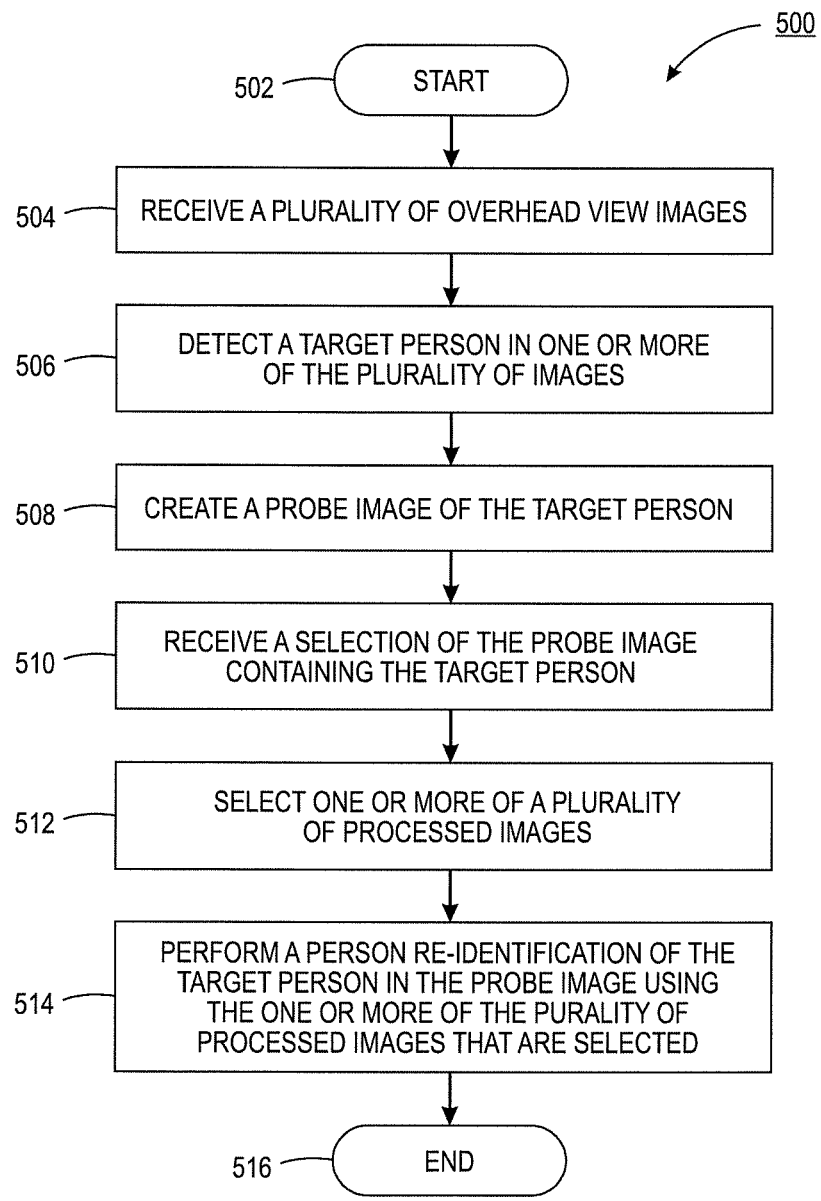
FIG. 5 illustrates a flowchart of an example method for performing a person re-identification using an overhead view image.
Figure 6:
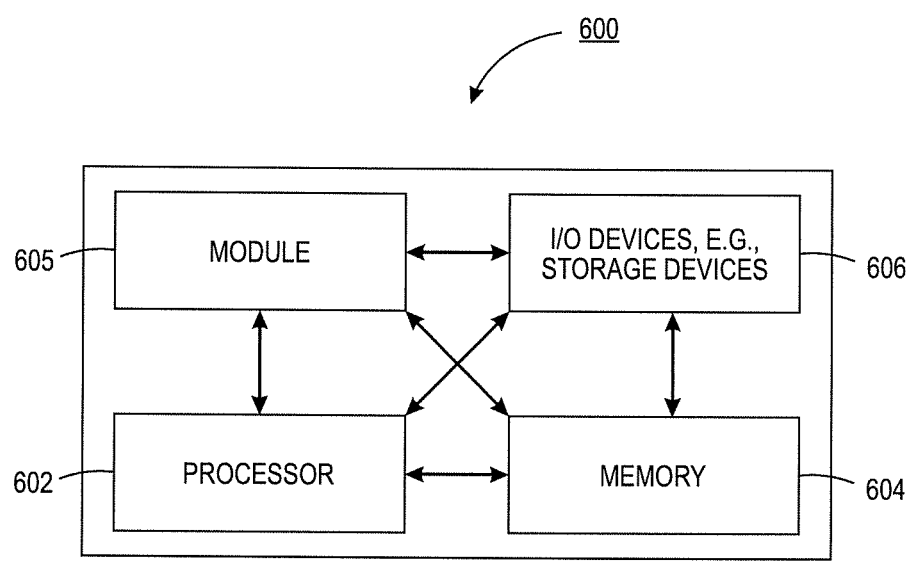
FIG. 6 illustrates a high-level block diagram of a computer suitable for use in performing the functions described herein.

FIG. 5 illustrates a flowchart of an example method 400 for performing a person re-identification using an overhead view image. In one embodiment, one or more steps or operations of the method 500 may be performed by the AS 104 or a computer as illustrated in FIG. 6 and discussed below.

At block 502, the method 500 begins. At block 504, the method 500 receives a plurality of overhead view images. In one embodiment, the overhead view images may be captured from a camera that is mounted on a ceiling of a location. The camera may be a wide angle or fisheye camera that can capture images or video at any desired resolution. The camera may capture the overhead view image along a viewing axis that is substantially perpendicular to the floor.

In one embodiment, the plurality of overhead view images may come from the same camera or from different cameras. The different cameras may be different views within the same location, different cameras at different locations, or both.

In one embodiment, the overhead view image may be a still image captured by the camera. In another embodiment, the overhead view image may be a snapshot of a video that is captured by the camera. For example, people may be tracked in the video and snapshots of the video may be created that contain potential persons of interest.

At block 506, the method 500 detects a target person in one or more of the plurality of overhead view images. For example, persons within each overhead view image may be tracked and/or detected. The operations performed by the person detection module 206 and/or the tracking module 212 may be used to track or detect the target person in the overhead view images.

At block 508, the method 500 creates a probe image of the target person. For example, for an overhead view image an additional image of the target may be created from the overhead view image. The additional image that is created may be enlarged sub images of the overhead view image for the target person that is detected within the overhead view image. The additional image may then be normalized to generate the probe image. For example, the orientation normalization module 208 may adjust an orientation of the target person within the additional image. The orientation may be adjusted to a desired orientation, as described above.

At block 510, the method 500 receives a selection of the probe image containing the target person. In one embodiment, the probe image may be viewed and selected by an endpoint device. For example, a user may connect to the an AS that processes the overhead view images to create the probe image of various different potential target persons and a selection of one of the probe images of the target person may be received.

As noted above, the probe image may be associated with a distortion profile associated with a radial distance from a center of the overhead view image that the probe image (e.g., the processed image that was selected to be the probe image) was obtained from. The radial distance may be used to select processed images of persons in the image gallery that may have a similar distortion profile that can be used to compare against the probe image for person re-identification, as discussed below.

At block 512, the method 500 selects one or more of a plurality of processed images. In one embodiment, the one or more of the plurality of processed images may be based on comparison of the distortion profiles associated with a radial distance from a center of a respective overhead view image. In other words, the one or more of the plurality of processed images that are selected may have a similar distortion profile as a distortion profile of the probe image based on a radial distance of the target person from a center of the a respective overhead view image of the plurality of overhead view images used to generate the probe image. In addition, the one or more processed images that are selected may also be normalized such that the person in the one or more processed images have a same orientation as the target person in the probe image.

In one embodiment, the processed images may be created by processing one or more of the plurality of overhead view images similar to how the probe image is created. In one embodiment, one or more persons in one or more of the plurality of overhead view images may be detected. One or more additional images of each one of the one or more persons that are detected may then be created. For example, for an overhead view image if five persons are detected within the overhead view image, then five different additional images may be created from the overhead view image. The additional images may be enlarged sub images of the overhead view image.

Each one of the additional images may be normalized to create the plurality of processed images. The plurality of processed images may be stored in the gallery of images from which the one or more processed images are selected to be used for comparison against the probe image.

In one embodiment, each person may be associated with a plurality of different processed images of the plurality of processed images. For example, there are 100 processed images in the gallery of images, 10 of the processed images may be of person A, 20 of the processed images may be of person B, 20 of the processed images may be of person C, 25 of the processed images may be of person D and 25 of the processed images may be of person E.

Each one of the different processed images of each person may be different views of each respective person. For example, one processed image of person A may be a front view of a face of person A from a first location, a second processed image of person A may be a view of the top of the head of person A in a second location, and so forth. Each one of the different processed images may also have a different distortion profile. In other words, each different view may be obtained from different radial distances from a center of the respective overhead view image that the processed image was obtained from.

In one embodiment, only a single processed image for each person may be selected. In other words, a different processed image of the plurality of processed images described above may be selected for each person. To illustrate using the example above, only one of the 10 images of person A having the most similar distortion profile to the distortion profile of the target person in the probe image may be selected, only one of the 20 processed images of person B having the most similar distortion profile to the distortion profile of the target person in the probe image may be selected, and so forth for persons C-E.

At block 514, the method 500 performs a person re-identification of the target person in the probe image using the one or more of the plurality of processed images that are selected. Any existing person re-identification method may be used.

In one embodiment, when the target person is re-identified successfully the method 500 may generate an output that is transmitted to the endpoint device that submitted the probe image and the request to perform the person re-identification. In one embodiment, the output may be a confirmation message. In another embodiment, the output may include the subset of the processed images were selected and had the best match to the target person in the probe image. In yet another embodiment, the output may include a subset of the processed images that had the matching scores exceed a predefined threshold or that are amount the top-N (e.g., top 5 or top 10) matches. At block 516, the method 500 ends.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, blocks or operations in FIG. 5 that recite a determining operation or involve a decision do not necessarily require that both branches of the determining operation be practiced. In other words, one of the branches of the determining operation can be deemed as an optional step. In addition, one or more steps, blocks, functions or operations of the above described method 500 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for performing a person re-identification using an overhead view image, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for performing a person re-identification using an overhead view image (e.g., a software program comprising computer-executable instructions) can be loaded into memory 604 and executed by hardware processor element 602 to implement the steps, functions or operations as discussed above in connection with the example method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for performing a person re-identification using an overhead view image (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for performing a person re-identification using an overhead view image, comprising:
receiving, by a processor, a plurality of overhead view images;
detecting, by the processor, a target person in one or more of the plurality of overhead view images;
creating, by the processor, a probe image of the target person;
receiving, by the processor, a selection of the probe image containing the target person;
selecting, by the processor, one or more of a plurality of processed images in an image gallery that has a similar distortion profile as a distortion profile of the probe image based on a radial distance of the target person from a center of a respective overhead view image of the plurality overhead view images used to generate the probe image; and
performing, by the processor, the person-re-identification of the target person in the probe image using the one or more of the plurality of processed images that are selected.

2. The method of claim 1, wherein the plurality of overhead view images comprise images that are captured along a viewing axis that is substantially perpendicular to a ground.

3. The method of claim 1, the plurality of overhead view images are captured by a fisheye camera.

4. The method of claim 1, wherein the creating the plurality of processed images comprises:
detecting, by the processor, one or more persons in one or more of the plurality of overhead view images;
creating, by the processor, one or more additional images of each one of the one or more persons that are detected; and
normalizing, by the processor, the one or more additional images to create the plurality of processed images.

5. The method of claim 4, wherein the one or more additional images are sub-images of a respective overhead view image of the plurality of overhead view images.

6. The method of claim 4, wherein the normalizing comprises:
adjusting, by the processor, an orientation of a person in each one of the one or more additional images.

7. The method of claim 1, wherein the plurality of processed images include different persons, wherein each one of the different persons is contained in a plurality of different processed images.

8. The method of claim 7, wherein the selecting comprises:
selecting, by the processor, only a single one of the plurality of different processed images for the each one of the different persons.

9. The method of claim 7, wherein the plurality of different processed images comprise different views.

10. The method of claim 9, wherein the different views of the each one of the different persons are captured at different orientations at different radial distances from a center of a respective overhead view image of the plurality of overhead view images.

11. The method of claim 1, wherein a person in each one of the one or more of the plurality of processed images that are selected is in a same orientation as the target person in the probe image.

12. A non-transitory computer-readable medium storing a plurality of instructions, which when executed by a processor, cause the processor to perform operations for performing a person re-identification using an overhead view image, the operations comprising:

receiving a plurality of overhead view images;
detecting a target person in one or more of the plurality of overhead view images;
creating a probe image of the target person;
receiving a selection of the probe image containing the target person;
selecting one or more of a plurality of processed images in an image gallery that has a similar distortion profile as a distortion profile of the probe image based on a radial distance of the target person from a center of a respective overhead view image of the plurality overhead view images used to generate the probe image; and
performing the person-re-identification of the target person in the probe image using the one or more of the plurality of processed images that are selected.

13. The non-transitory computer readable medium of claim 12, wherein the plurality of overhead view images comprise images that are captured along a viewing axis that is substantially perpendicular to a ground.

14. The non-transitory computer readable medium of claim 12, wherein the creating the plurality of processed images comprises:

detecting one or more persons in one or more of the plurality of overhead view images;
creating one or more additional images of each one of the one or more persons that are detected; and
normalizing the one or more additional images to create the plurality of processed images.

15. The non-transitory computer readable medium of claim 14, wherein the one or more additional images are sub-images of a respective overhead view image of the plurality of overhead view images.

16. The non-transitory computer readable medium of claim 14, wherein the normalizing comprises:

adjusting an orientation of a person in each one of the one or more additional images.

17. The non-transitory computer readable medium of claim 12, wherein the plurality of processed images include different persons, wherein each one of the different persons is contained in a plurality of different processed images.

18. The non-transitory computer readable medium of claim 17, wherein the selecting comprises:

selecting only a single one of the plurality of different processed images for the each one of the different persons.

19. The non-transitory computer readable medium of claim 17, wherein the plurality of different processed images comprise different views, wherein the different views of the each one of the different persons are captured at different orientations at different radial distances from a center of a respective overhead view image of the plurality of overhead view images.

20. A method for performing a person re-identification using an overhead view image, comprising:

receiving, by a processor, a plurality of overhead view images;
detecting, by the processor, one or more persons in one or more of the plurality overhead view images;
creating, by the processor, a plurality of processed images of the one or more persons from the plurality of overhead view images, wherein the plurality of processed images are stored in a gallery of images;
detecting, by the processor, a target person in a second one or more of the plurality of overhead view images;
creating, by the processor, a probe image of the target person;
receiving, by the processor, a selection of the probe image containing the target person;
selecting, by the processor, one or more of the plurality of processed images that has a similar distortion profile as a distortion profile of the probe image based on a radial distance of the target person from a center of a respective overhead view image of the plurality overhead view images used to generate the probe image; and
performing, by the processor, the person-re-identification of the target person in the probe image using the one or more of the plurality of processed images that are selected.

* * * * *